US012062868B2

(12) United States Patent
Stoyanov et al.

(10) Patent No.: US 12,062,868 B2
(45) Date of Patent: Aug. 13, 2024

(54) ELECTRICAL CONNECTOR WITH POSITIVE LOCKING POSITION ASSURANCE

(71) Applicants: TE Connectivity Services GmbH, Schaffhausen (CH); TE Connectivity India Private Limited, Bangalore (IN)

(72) Inventors: Anton Stoyanov, Winston Salem, NC (US); Michael Dale Brown, Winston Salem, NC (US); Hurley Chester Moll, Middletown, PA (US); Madan Kumara M C, Bangalore (IN)

(73) Assignees: TE Connectivity India Private Limited (IN); TE Connectivity Solutions GmbH (CH)

( * ) Notice: Subject to any disclaimer, the term of this patent is extended or adjusted under 35 U.S.C. 154(b) by 572 days.

(21) Appl. No.: 17/224,666

(22) Filed: Apr. 7, 2021

(65) Prior Publication Data

US 2022/0329009 A1 Oct. 13, 2022

(51) Int. Cl.
*H01R 13/629* (2006.01)
*H01R 13/04* (2006.01)

(52) U.S. Cl.
CPC ....... *H01R 13/62916* (2013.01); *H01R 13/04* (2013.01)

(58) Field of Classification Search
CPC .............. H01R 13/62916; H01R 13/04; H01R 13/4365; H01R 13/639; H01R 13/40; H01R 13/46; H01R 13/633; H01R 24/00
See application file for complete search history.

(56) References Cited

U.S. PATENT DOCUMENTS

2002/0064994 A1* 5/2002 Tachi ................. H01R 13/4223 439/595
2022/0029346 A1* 1/2022 Tiemann .............. H01R 13/745

FOREIGN PATENT DOCUMENTS

CN 112310706 A * 2/2021
DE 102012103399 A1 * 10/2013 ......... H01R 13/4223
KR 102270012 B1 * 6/2021

* cited by examiner

*Primary Examiner* — Jean F Duverne

(57) ABSTRACT

An electrical connector comprises a housing defining a receptacle opening for receiving a mating connector in a mating direction and a terminal positioning component slidably received within the receptacle opening and moveable in the mating direction. The terminal positioning component includes a pin protection plate defining at least one aperture sized to receive a conductive pin of at least one terminal arranged within the housing, and a terminal assurance element extending from the pin protection plate in the mating direction. The terminal assurance element is adapted to prevent the movement of the component in the mating direction when the at least one terminal is in a partially inserted state within the housing. The connector further comprises a first locking element arranged on a wall of the housing for selectively fixing the position of the terminal positioning component within the receptacle in the mating direction.

20 Claims, 5 Drawing Sheets

ELECTRICAL CONNECTOR WITH POSITIVE LOCKING POSITION ASSURANCE

FIELD OF THE INVENTION

The present disclosure relates to electrical connectors, and more particularly, to electrical connectors having terminal position assurance and pin protection features.

BACKGROUND

Electrical connector systems often suffer terminal damage during mating operations. For example, male inline connector systems may be particularly susceptible to bent pins and stubbing issues as corresponding male and female connectors are engaged. In order to improve connector reliability and avoid these aforementioned drawbacks, it may be desired to implement a so-called pin protection plate (PPP), also known as a male blade stabilizer (MBS), into a male inline connector system. These devices protect terminal pins by shortening and stiffening their exposed lengths, as well as by aligning the pins for stubbing mitigation. Male inline connectors may also include a terminal position assurance (TPA) device or component, which ensures that a partially seated terminal is detected during assembly or mating of the connector system. In this way, an operator may identify and remedy a terminal placement issue during the mating process, avoiding connector damage and/or a failed or unreliable connection.

Given these benefits, the demand for connectors utilizing TPA components and PPPs has increased. However, their implementation is not without drawbacks. For example, the use of separate PPPs and TPA devices increases manufacturing and assembly costs, as well as connector complexity. Moreover, these components often increase the force required to mate corresponding connectors. As a result, PPPs and/or TPAs have traditionally been implemented in larger connector systems which include mechanical assist actuation (levers, slides, etc.), whereby increased mating force is less of a concern due to the mechanical advantage gained by these assists. Hand-mated connectors, however, have more strict mating force requirements, and the addition of a PPP and/or TPA device can exacerbate these challenges. Further, it is also desired to implement these types of protective solutions into smaller and/or lower cost connectors, wherein mechanical assists and/or multiple separate components are not possible or practical to implement.

Accordingly, there is a need for improved electrical connector assemblies which provide the benefits of traditional PPPs and TPA components, without excessively high mating forces, and which reduced component numbers and overall connector size.

SUMMARY

In one embodiment of the present disclosure, an electrical connector comprises a housing defining a receptacle opening for receiving a mating connector in a mating direction. A terminal positioning component of the connector is slidably received within the receptacle opening and is moveable in the mating direction. The terminal positioning component includes a pin protection plate defining at least one aperture sized to receive a conductive pin of at least one terminal arranged within the housing and a terminal assurance element extending from the pin protection plate in the mating direction. The terminal assurance element is adapted to prevent the movement of the terminal positioning component in the mating direction when the at least one terminal is in a partially inserted state within the housing. The connector further comprises a first locking element arranged on a wall of the housing for selectively fixing the position of the terminal positioning component within the receptacle in the mating direction. The terminal positioning component is moveable in the mating direction between: 1) a first position wherein the pin protection plate is arranged above a free end of the conductive pin of the at least one terminal; 2) a second position wherein the first locking element is engaged with the terminal positioning component and the conductive pin of the at least one terminal is arranged partially through the pin protection plate; and 3) a third position associated with a mated state of the connector.

In one embodiment, the housing further defines at least one terminal opening adapted to receive and hold the at least one terminal in a fully inserted state, and a second locking element adapted to fix the at least one terminal in the fully inserted state within the terminal opening. The second locking element is moveable between a first position corresponding to the partially inserted state of the terminal within the terminal opening, and a second position corresponding to the fully inserted state of the terminal. With the second locking element in the first position, the terminal assurance element is adapted to contact the second locking element as the terminal positioning component is moved from the first position in the mating direction toward the third position, thereby preventing its further translation into the third position.

According to another embodiment, an electrical connector assembly is provided which includes a first electrical connector according to the above embodiment, and a second or mating connector mateable with the first electrical connector. The second connector includes a second housing adapted to bias the first locking element into an unlocked position, permitting the terminal positioning component to move or translate in the mating direction. The first locking element comprises a first elastic latch arm engageable with the terminal positioning component in the second position for fixing its position within the receptacle.

BRIEF DESCRIPTION OF THE DRAWINGS

The invention will now be described by way of example with reference to the accompanying Figures, of which.

DETAILED DESCRIPTION OF THE EMBODIMENTS

Figure 1:
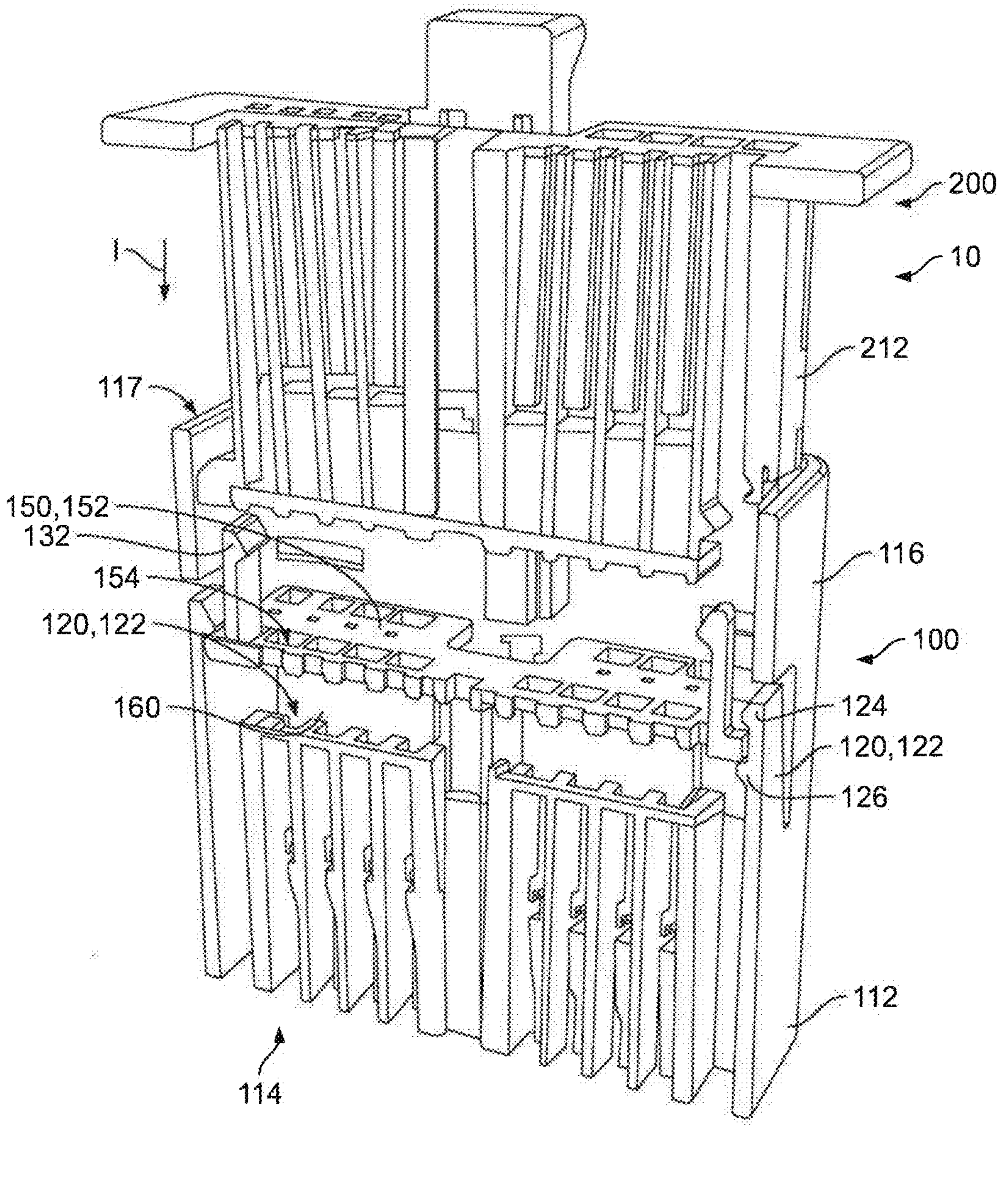
FIG. 1 is a perspective view of a connector assembly including a male connector and a female connector according to an embodiment of the present disclosure in an unmated state or position.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

Embodiments of the present disclosure include a male electrical connector having a terminal and pin positioning device or member which provides the functionality of both a traditional pin protection plate and a terminal position assurance component. This arrangement lowers costs by reducing the number of components, as well as simplifies assembly of the connector. The connector further includes one or more positive locking elements incorporated into a sidewall of the connector housing for preventing the device from prematurely engaging. The locking element(s) is moveable or biasable into a disengaged position by a mating or female connector during a mating process for reducing insertion forces. In this way, embodiments of the present disclose may be implemented into unassisted, hand-mate connector assemblies. Further, by incorporating the positive locking features into the sidewall of the housing, overall connector size can be reduced.

Figure 2:
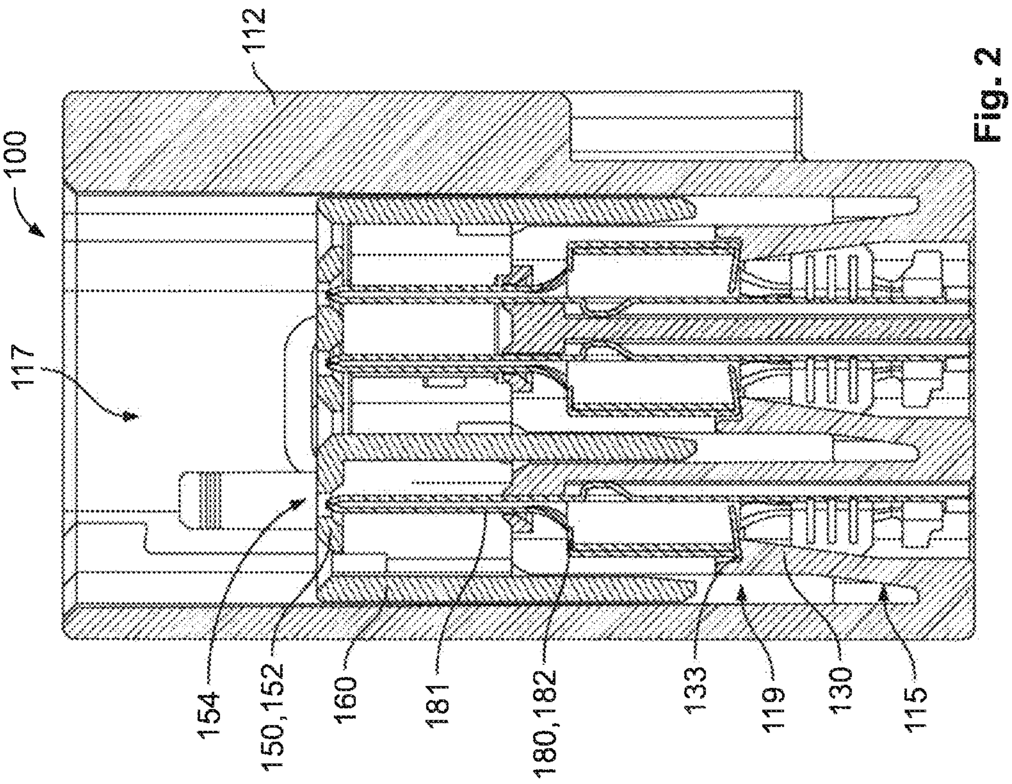
FIG. 2 is a cross sectional view of the male connector of FIG. 1 having a terminal positioning device according to an embodiment of the present disclosure in a first or shipping position.
Figure 4:
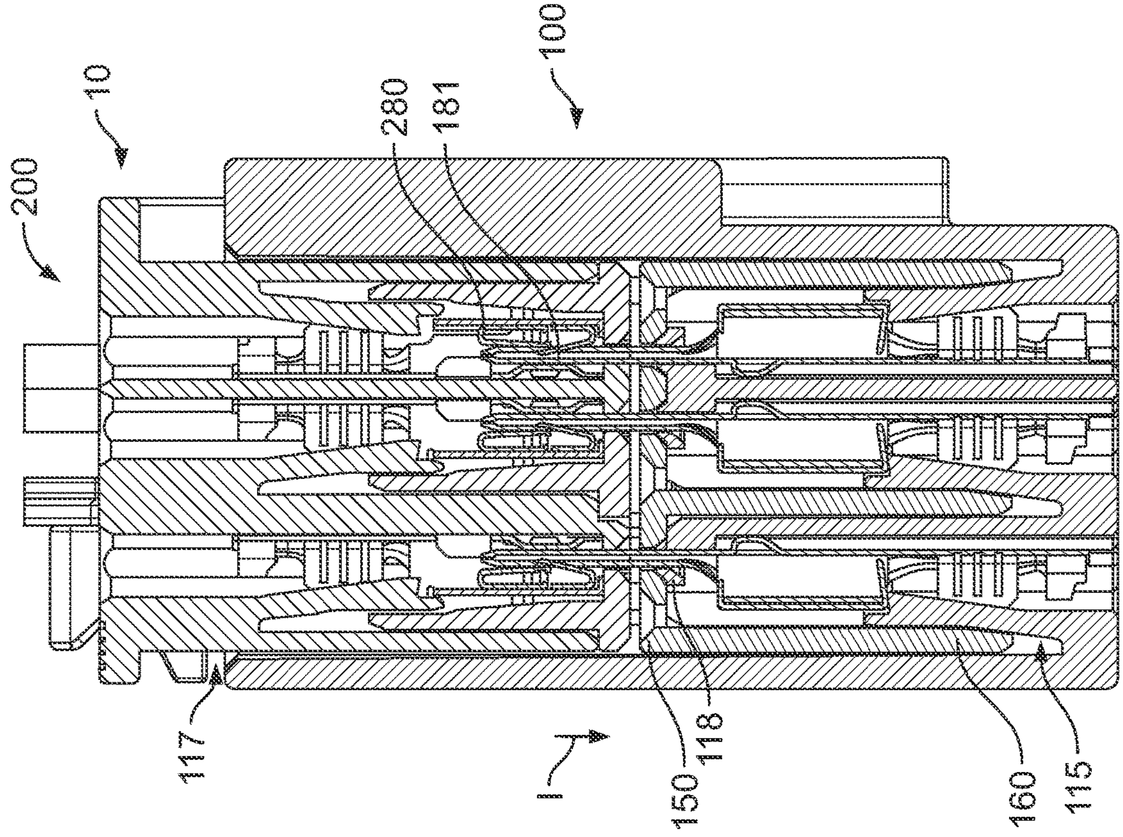
FIG. 4 is a cross sectional view of a connector assembly including the male connector and terminal positioning device of FIGS. 2 and 3, and a corresponding female connector mated therewith, with the terminal positioning device biased into a third or final position.

Referring generally to FIG. 1, a connector assembly 10 according to an embodiment of the present disclosure includes a male connector 100 and a female connector 200 mateable therewith. The male connector 100 includes a housing or body 112 having a plurality of terminal holders or openings 114 formed therein and configured to hold a plurality of electrically conductive terminals, for example, a plurality of male terminals 180 and associated conductive pins 181 as shown in FIG. 2. A mating end 116 of the housing 112 defines a socket or opening 117 for slidably receiving the female connector 200. A housing 212 of the female connector 212 holds a plurality of corresponding female terminals 280 for mating with the male terminals 180, as shown in FIG. 4.

The connector assembly 10 further includes a terminal and pin positioning device or component. Specifically, a terminal positioning component (TPC) 150 includes a top plate 152 defining a plurality of apertures 154 formed therethrough corresponding in size and location to the plurality of pins 181 of the male terminals 180, as shown in FIG. 2. The terminal positioning component 150 is slidably arranged within the housing 112 and moveable therein along an insertion direction I of the female connector 200. The terminal positioning component 150 further comprises one or more terminal assurance elements or fingers 160 extending generally perpendicularly from an underside of the top plate 152 in the insertion direction I. As set forth in greater detail with respect to FIGS. 2-4, the terminal assurance elements 160 are configured to ensure each terminal 180 is properly positioned within the terminal holders 114 of the connector housing 112 before and/or during a mating operation with the female connector 200.

Still referring to FIG. 1, the housing 112 further comprises a plurality of positive locking features or latches 120 defined on opposing exterior sidewalls thereof. Each locking feature or latch 120 defines a cantilevered arm 122 having a free end extending in a direction generally opposite the insertion direction I. Each arm 122 includes a first latching protrusion 124 and a second latching protrusion 126 extending therefrom in a direction generally into the opening 117. As illustrated in the exemplary pre-stage position shown in FIG. 1, the TPC 150, and more specifically the top plate 152 thereof, is adapted to be held in position between a recess defined between the first and second latching protrusions 124,126, prior to its engagement with the female connector 200.

The terminal positioning component 150 may further comprise one of more additional locking latches 132 configured to engage with the female connector 200 during a mating operation. In this way, upon disassembly of a mated connector assembly, the engagement of the latches 132 with the female connector 200 will cause the TPC 150 to be raised in a direction opposite the insertion direction I as the female connector is removed, returning the TPC to the illustrated pre-stage position, and readying the male connector 100 for reinsertion of the female connector 200. It should be understood that the latches 132 will automatically release from the female connector 200 due to their ramped surfaces once the TPC 150 is captured against the first latching protrusion 124 of the latch 120 during the unmating process.

Referring now to FIG. 2, the male connector 100 is shown with the TPC 150 arranged in a first stage or position within the housing 112. The first position may correspond to a shipping position of the connector 100, wherein the terminal pins 181 are arranged under at least a top surface of the top plate 152 of the TPC 150, and are thus protected from damage. In the first position of the TPC, the terminals 180 may be inserted into a respective one of the terminal holders 114 of the housing 112 from an underside thereof and in a direction opposite the insertion direction I.

Each terminal holder or opening 114 is defined in part by an elastic terminal retention latch or arm 130 formed with the housing 112 and adapted to retain a terminal 180 inserted therein in a fully installed or inserted position. For each terminal holder 114, the housing 112 further defines a recess 115 arranged on a side of each of the terminal retention arm 130 opposite the terminal holder 114. As can be visualized from FIG. 2, as the terminal 180 is inserted into the terminal holder 114, a portion 182 of the terminal 180 abuts and biases the retention arm 130 into the unoccupied recess 115 in an area 119 thereof, permitting the terminal to be continually biased into the illustrated fully inserted position. Once in the inserted position, the retention arm 130 clears the portion 182 of the terminal 180, and is free to elastically return to the illustrated locked position, wherein a notch 133 formed in the retention arm engages with a corresponding opposing surface of the terminal for preventing motion of the terminal in a direction opposite its insertion direction, or in the insertion direction I of the female connector 200.

Still referring to FIG. 2, each terminal assurance element 160 of the TPC 150 corresponds in location to, and is received by, a respective one of the recesses 115. In the first or shipping position of FIG. 2, the elements 160 do not extend into the recess 115 to the depth of the area 119, and thus, do not prevent the installation of the terminals 180 by inhibiting the deflection of the retention arm 130 into these areas during terminal installation. As further shown in FIG. 2, the terminal openings 154 of the top plate 152 taper from an underside of the top plate, or are defined with a countersunk profile, such that axial misalignment of the terminal pins 181 do not prevent their insertion into the openings, as the tapers guide the ends of the terminal pins toward an ideal center or orientation as there are received within the openings, as shown in FIG. 3.

Figure 3:
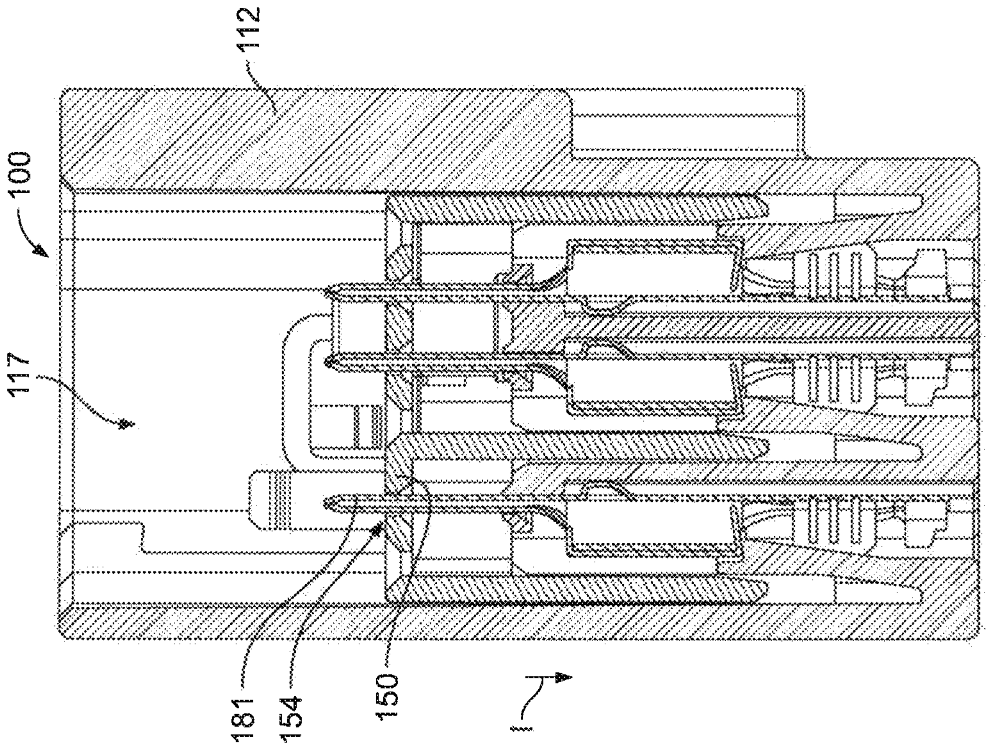
FIG. 3 is a cross sectional view of the male connector and terminal positioning device of FIG. 2 in a second or pre-stage position.

With further respect to FIG. 3, in a second stage or position, the TPC 150 is pressed axially downward in the insertion direction further into the receiving opening 117 of the connector housing 112. As it is translated, the terminal pins 181 pass through respective ones of the openings 154 formed in the top plate 152. In this pre-stage position, the TPC 150 accurately aligns the terminal pins 181, and prevents damage thereto during subsequent connector mating operations by effectively shortening the exposed and/or unsupported length of each pin. This pre-positioning of the TPC 150 may be achieved manually or with the aid of fixturing, and prior to an insertion operation of a mating connector.

As can be further visualized from FIG. 3, if one or more of the terminals 180 were not in a full installed position within its holder 114, a respective retention arm 130 would be at least partially biased into the area 119 of the recess 115. In this case, the terminal assurance element(s) 160 and the TPC 150 would be preventing from moving fully into the second or pre-stage position. The inability to manually set the TPC 150 in the pre-stage position would indicate to an operator that a terminal is not properly positioned within the housing, as well as physically prevent connector mating in such a condition.

Referring now to FIG. 4, in a third or final stage or position, the female mating connector 200 has been introduced into the receiving opening 117 of the male connector 100 in the insertion direction I. Specifically, after contacting the TPC 150, further insertion of the female connector 200 biases the TPC into the final or installed position, and generally against a complementary opposing surface 118 of the housing 112. The opposing surface 118 may comprise a plurality of conical protrusions complementary to the recesses or countersinks formed in the underside of the top plate 152. This arrangement ensures generally uninterrupted support of the terminal pins 181 along their length, as well as even support of the top plate 152 by the housing 112 in the mated position. As illustrated, in the third position, each terminal pin 181 is engaged with a corresponding one of the female terminals 280 of the connector 200 for establishing an electrical connection therewith. Each terminal assurance element 160 is also biased further into a respective one of the recesses 115, and uninterrupted by the retention arms 130.

Figure 5:
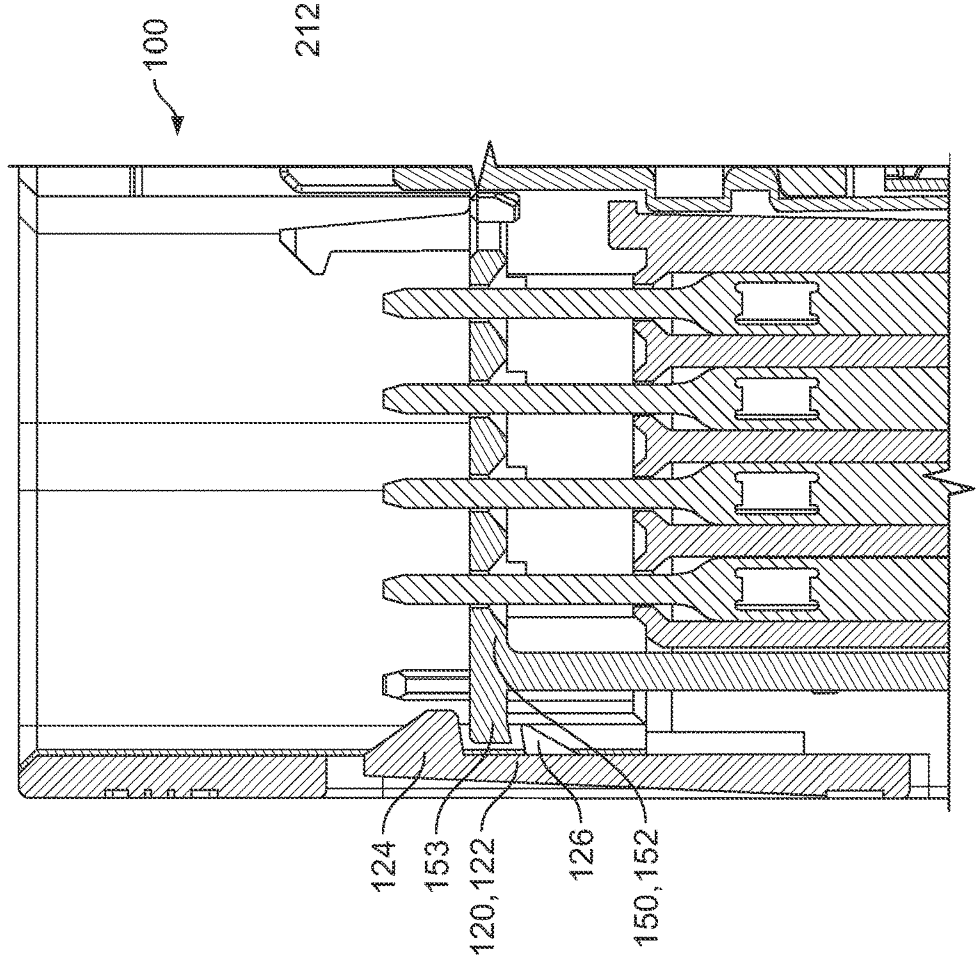
FIG. 5 is another cross sectional view of the male connector and terminal positioning device in the pre-stage position.

FIG. 5 illustrates another cross section of the male connector 100 with the TPC 150 in the second or pre-stage position, as shown in FIGS. 1 and 3. In the pre-stage position, the top plate 152 is positively held by the positive locking feature 120. More specifically, an outer peripheral edge 153 of the top plate 152 is secured within a recess defined between opposing surfaces of the latching protrusions 124,126 of the elastic latching arm 122, preventing motion of the TPC 150 along an insertion axis of the connector 100.

Figure 6:
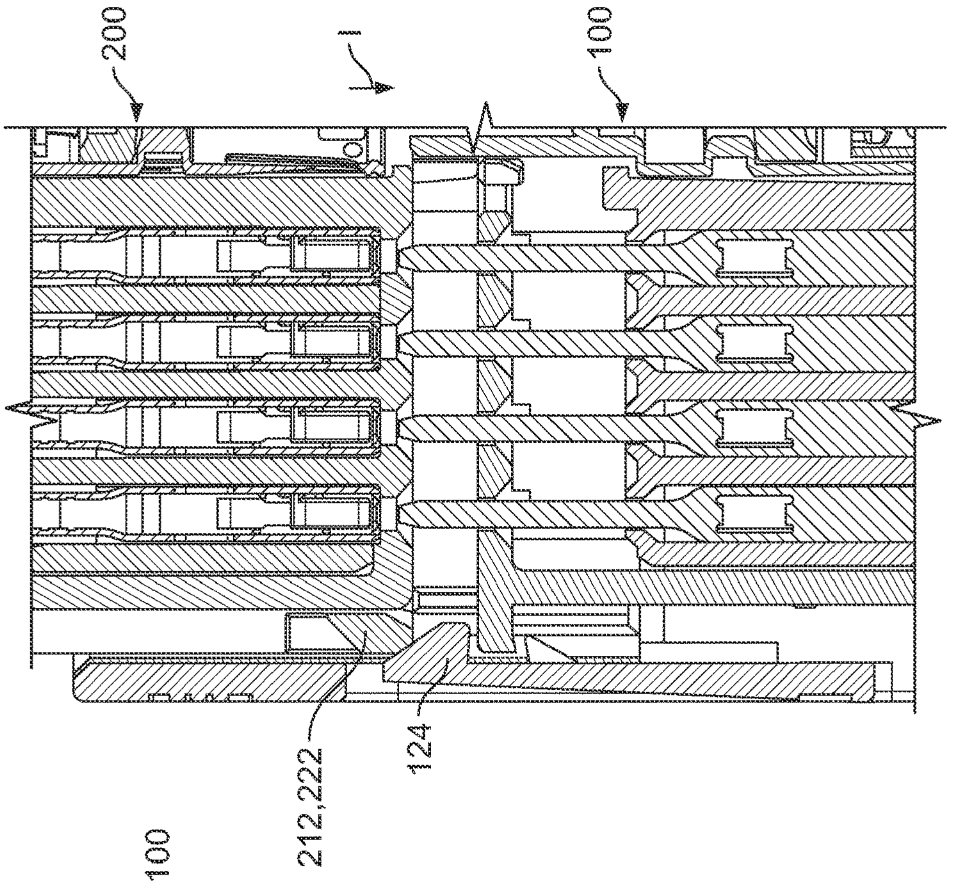
FIG. 6 is a cross sectional view of the connector assembly of FIG. 1 with the female connector in a first partially mated position relative to the male connector.
Figure 7:
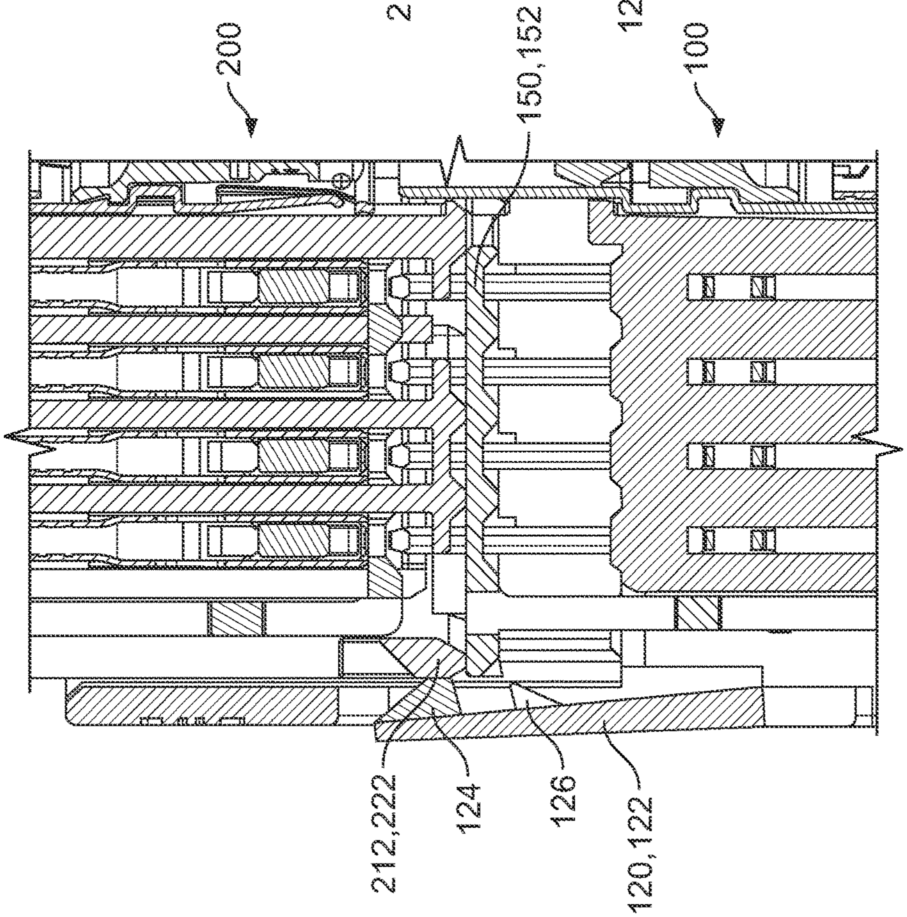
FIG. 7 is a cross sectional view of the connector assembly of FIG. 1 with the female connector in a second partially mated position relative to the male connector.

With reference to FIG. 6, upon insertion of the female connector 200 in the mating or insertion direction I, an outer peripheral lip 222 of the housing 212 engages with a tapered or ramped surface of the first latching protrusion 124. As shown in FIG. 7, further insertion pressure on the female connector 200 biases the latching arm 122 of the positive locking feature 120 elastically outward via its interference with the lip 222 of the housing 212. Releasing the TPC 150 from between the latching protrusions 124,126 permits its translation toward the installed position. As the TPC 150 is biased generally downwardly, the terminal pins 181 begin to penetrate the connector 200 while being supported and thus protected by the top plate 152. With the latching arm 122 biased out of contact with the device 150 by the connector 200, mating or insertion forces are significantly reduced, addressing the above-described drawbacks of the prior art.

Figure 8:
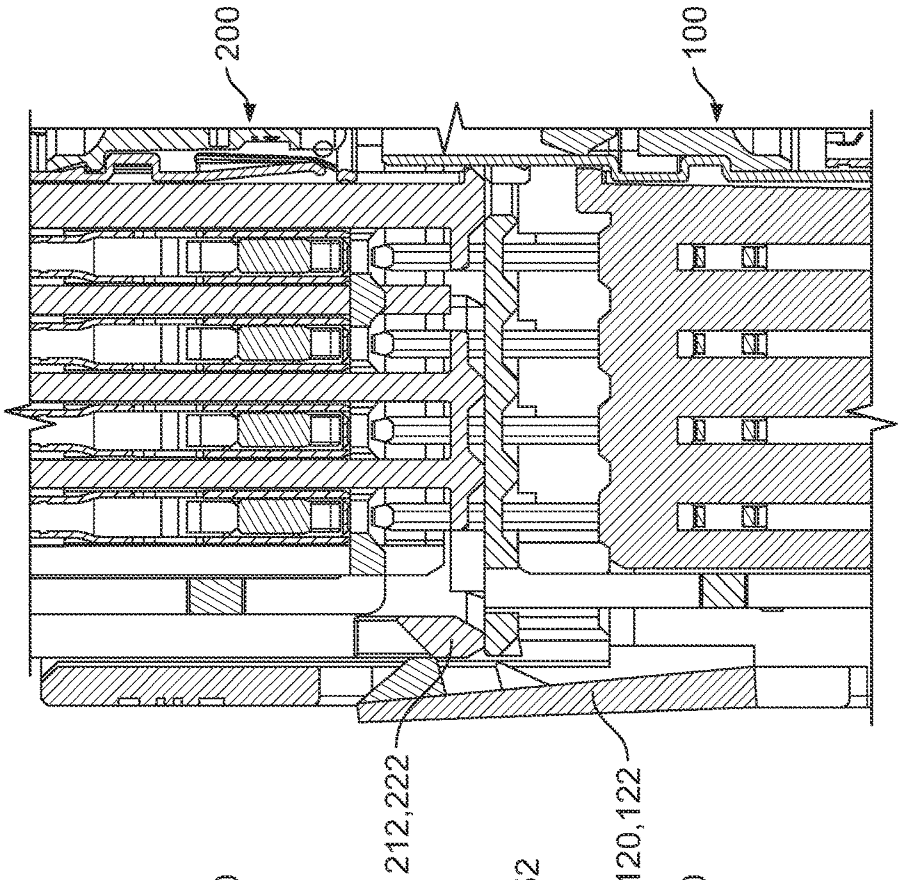
FIG. 8 is a cross sectional view of the connector assembly of FIG. 1 with the female connector in a third partially mated position relative to the male connector.

Finally, as can be visualized in FIGS. 4 and 8, in the installed position the latching arm 122 of the positive lock 120 is permitted to elastically return to the position illustrated in FIGS. 5 and 6, with the peripheral lip 222 of the housing 212 ultimately residing below the lower latching protrusion 126. In this way, the female connector 200 is positively retained in the installed position by the positive locking element 120. The opposing surface of the lower latching protrusion 126 may also be tapered, permitting the removal of the female connector 200 via only tension placed thereon. In other embodiments, the lower latching protrusion 126 may not comprise a tapered surface, but rather, a surface parallel to the end of the connector 200 and normal to the insertion direction I. In this embodiment, the latching arm 122 must be manually lifted out of engagement with the female connector 200, for example, by a prying tool, and the connector subsequently removed.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range.

Also, the indefinite articles "a" and "an" preceding an element or component of the invention are intended to be nonrestrictive regarding the number of instances, that is, occurrences of the element or component. Therefore "a" or "an" should be read to include one or at least one, and the singular word form of the element or component also includes the plural unless the number is obviously meant to be singular.

The term "invention" or "present invention" as used herein is a non-limiting term and is not intended to refer to any single embodiment of the particular invention but encompasses all possible embodiments as described in the application.

What is claimed is:

1. An electrical connector comprising:

a housing defining a receptacle opening for receiving a mating connector in a mating direction;

a terminal positioning component slidably received within the receptacle opening and moveable in the mating direction, including:

a pin protection plate defining at least one aperture sized to receive a conductive pin of at least one terminal arranged within the housing; and a terminal assurance element extending from the pin protection plate in the mating direction and adapted to prevent the movement of the component in the mating direction when the at least one terminal is in a partially inserted state within the housing, the terminal positioning component moveable in the mating direction between:

a first position wherein the pin protection plate is arranged above a free end of the conductive pin of the at least one terminal;

a second position wherein the conductive pin of the at least one terminal is arranged through the pin protection plate; and a third position associated with a mated state of the connector; and a first locking element comprising a first elastic arm arranged on a wall of the housing for fixing the terminal positioning component in the second position within the receptacle in the mating direction.

2. The electrical connector of claim 1, wherein in the second position of the terminal positioning component the first locking element is engaged with the terminal positioning component and the conductive pin of the at least one terminal is arranged partially through the pin protection plate.

3. The electrical connector of claim 2, wherein motion of the terminal positioning component from the first position to the third position is prevented by the terminal assurance element when the at least one terminal is in the partially inserted state within the housing.

4. The electrical connector of claim 3, wherein motion of the terminal positioning component from the first position to the second position is prevented when the at least one terminal is in the partially inserted state within the housing.

5. The electrical connector of claim 4, wherein, with the terminal positioning component in the second position or the third position, a terminal is prevented from being fully inserted into the housing by the terminal assurance element.

6. The electrical connector of claim 1, wherein the first elastic arm comprises first and second latching protrusions defining a recess adapted to receive an edge of the pin protection plate in the second position of the terminal positioning component.

7. The electrical connector of claim 6, wherein in a locked position of the first locking element, a free end of the first elastic arm extends into the receptacle opening for engaging with a mating connector inserted into the receptacle.

8. The electrical connector of claim 7, wherein the first locking element is adapted to be biased into an unlocked position in response to the insertion of the mating connector into the receptacle.

9. The electrical connector of claim 2, wherein the housing further defines:

at least one terminal opening adapted to receive and hold the at least one terminal in a fully inserted state; and a second locking element adapted to fix the terminal in the fully inserted state within the terminal opening, the second locking element moveable between a first position corresponding to the partially inserted state of the terminal within the terminal opening and a second position corresponding to the fully inserted state of the terminal.

10. The electrical connector of claim 9, wherein, with the second locking element in the first position, terminal assurance element is adapted to contact the second locking element as the terminal positioning component is moved from the first position toward the third position in the mating direction.

11. The electrical connector of claim 10, wherein the housing defines an aperture receiving the terminal assurance element in the mating direction.

12. The electrical connector of claim 11, wherein the second locking element is arranged at least partially within the aperture in the first position of the second locking element.

13. The electrical connector of claim 12, wherein the second locking element comprises an elastic arm adapted to be biased into the second position as the at least one terminal is inserted into the terminal opening.

14. An electrical connector assembly comprising:

a first electrical connector having:

a first housing defining a receptacle opening for receiving a mating connector in a mating direction;

a terminal positioning component slidably received within the receptacle opening and moveable in the mating direction, including:

a pin protection plate defining at least one aperture sized to receive a conductive pin of at least one terminal arranged within the housing; and a terminal assurance element extending from the pin protection plate in the mating direction and adapted to prevent the movement of the component in the mating direction when the at least one terminal is in a partially inserted state within the housing; and a first locking element arranged on a wall of the housing and selectively engaging with the terminal positioning component for fixing its position within the receptacle in the mating direction; and a second electrical connector mateable with the first electrical connector, the second connector including a second housing adapted to selectively engage with the first locking element to bias the first locking element into an unlocked position for permitting the terminal positioning component to move in the mating direction.

15. The electrical connector assembly of claim 14, wherein the terminal positioning component is moveable in the mating direction between:

a first position wherein the pin protection plate is arranged above a free end of the conductive pin of the at least one terminal;

a second position wherein the first locking element is engaged with the terminal positioning component and the conductive pin of the at least one terminal is arranged partially through the pin protection plate; and a third position associated with a mated state of the connector assembly, wherein motion of the terminal positioning component from the first position to the third position is prevented by the terminal assurance element when the at least one terminal is in the partially inserted state within the housing.

16. The electrical connector assembly of claim 15, wherein the first locking element comprises a first elastic arm formed on the wall of the housing and selectively engageable with the terminal positioning component in the second position.

17. The electrical connector assembly of claim 16, wherein the first elastic arm comprises first and second latching protrusions defining a recess adapted to receive an edge of the pin protection plate in the second position of the terminal positioning component.

18. The electrical connector assembly of claim 16, wherein the mating connector is adapted to engage with a free end of the first elastic arm for biasing the first locking element into the unlocked position in response to the insertion of the second connector into the receptacle.

19. The electrical connector assembly of claim 15, wherein the first housing further defines:

at least one terminal opening adapted to receive and hold the at least one terminal in a fully inserted state; and a second locking element adapted to fix the terminal in the fully inserted state within the terminal opening, the second locking element moveable between a first position corresponding to the partially inserted state of the terminal within the terminal opening and a second position corresponding to a fully inserted state of the terminal, wherein, with the second locking element in the first position, terminal assurance element is adapted to contact the second locking element as the terminal positioning component is moved from the first position toward the third position in the mating direction.

20. An electrical connector comprising:

a housing defining a receptacle opening for receiving a mating connector in a mating direction; and a terminal positioning component slidably received within the receptacle opening and moveable in the mating direction, including:

a pin protection plate defining at least one aperture sized to receive a conductive pin of at least one terminal arranged within the housing; and a terminal assurance element extending from the pin protection plate in the mating direction and adapted to prevent the movement of the component in the mating direction when the at least one terminal is in a partially inserted state within the housing, the terminal positioning component moveable in the mating direction between:

a first position wherein the pin protection plate is arranged above a free end of the conductive pin of the at least one terminal;

a second position wherein the conductive pin of the at least one terminal is arranged partially through the pin protection plate; and a third position associated with a mated state of the connector, wherein motion of the terminal positioning component from the first position to the third position is prevented by the terminal assurance element when the at least one terminal is in the partially inserted state within the housing.

* * * * *